US011857994B1

(12) United States Patent
Hammerlund

(10) Patent No.: US 11,857,994 B1
(45) **Date of Patent: *Jan. 2, 2024**

(54) CROSSOVER PREVENTION VALVE

(71) Applicant: Gary M. Hammerlund, Grand Rapids, MI (US)

(72) Inventor: Gary M. Hammerlund, Grand Rapids, MI (US)

( * ) Notice: Subject to any disclaimer, the term of this patent is extended or adjusted under 35 U.S.C. 154(b) by 638 days.

This patent is subject to a terminal disclaimer.

(21) Appl. No.: 16/866,008

(22) Filed: May 4, 2020

Related U.S. Application Data

(63) Continuation-in-part of application No. 15/294,090, filed on Oct. 14, 2016, now Pat. No. 10,639,656.

(60) Provisional application No. 62/888,008, filed on Aug. 16, 2019, provisional application No. 62/242,589, filed on Oct. 16, 2015.

(51) Int. Cl.

| | |
|---|---|
| ***B05B 7/00*** | (2006.01) |
| ***F16K 11/10*** | (2006.01) |
| ***F16K 15/14*** | (2006.01) |
| ***B05B 7/12*** | (2006.01) |
| ***B05B 7/04*** | (2006.01) |

(52) U.S. Cl.
CPC .......... *B05B 7/1254* (2013.01); *B05B 7/0408* (2013.01)

(58) Field of Classification Search
CPC ... B05B 7/1254; B05B 7/0408; B05B 7/0483; B05B 7/025; B05B 7/0031; F16K 11/105; F16K 15/147
See application file for complete search history.

(56) References Cited

U.S. PATENT DOCUMENTS

| | | | |
|---|---|---|---|
| 2,662,724 | A | 12/1953 | Kravagna |
| 3,485,453 | A | 12/1969 | Peeps |
| 3,633,795 | A | 1/1972 | Brooks |
| 4,074,363 | A | 2/1978 | Croft |
| 4,666,086 | A | 5/1987 | Cunningham |
| 4,779,902 | A | 9/1988 | Lee |
| 4,936,335 | A | 6/1990 | Macon |
| 5,033,655 | A | 7/1991 | Brown |
| 5,443,183 | A | 8/1995 | Jacobsen et al. |
| 5,462,204 | A | 10/1995 | Finn |
| 5,529,245 | A | 6/1996 | Brown |

(Continued)

OTHER PUBLICATIONS

SynUthane International Inc. "Polyurethane Processing Equipment and Processing Overview." Understanding Polyurethanes (2002): F-1-67.

(Continued)

*Primary Examiner* — Tuongminh N Pham

(74) *Attorney, Agent, or Firm* — Gardner, Linn, Burkhart & Ondersma LLP

(57) ABSTRACT

A crossover prevention valve for use in a multi-component fluid mixing and dispensing system includes a valve body defining at least two fluid passageways having respective one-way check valves at their outlet ends. A forward end of the valve body cooperates with an interior surface of a dispensing nozzle to define a mixing chamber for chemically reactive fluids prior to discharging the mixed fluids out of the dispensing nozzle. The crossover prevention valve does not permit reverse flow, thereby preventing clogs due to undesired intrusion of one reactant into the flow path of another reactant. Solidified reactants left in the mixing chamber are easily removed from the valve body, permitting the valve body to be reused even after sitting for extended periods.

20 Claims, 8 Drawing Sheets

(56) References Cited

U.S. PATENT DOCUMENTS

| | | | |
|---|---|---|---|
| 5,740,965 | A | 4/1998 | Miyagi et al. |
| 5,799,876 | A | 9/1998 | Isler |
| 5,810,885 | A | 9/1998 | Zinger |
| 5,893,486 | A | 4/1999 | Wasmire |
| 6,021,961 | A | 2/2000 | Brown |
| 6,165,201 | A | 12/2000 | Sawhney et al. |
| 6,234,666 | B1 | 5/2001 | Kolb |
| 6,345,776 | B1 | 2/2002 | Hurray et al. |
| 6,375,096 | B1 | 4/2002 | Rashidi |
| 6,461,325 | B1 | 10/2002 | Delmotte et al. |
| 6,835,186 | B1 | 12/2004 | Pennington et al. |
| 7,559,440 | B2 | 7/2009 | Rueschhoff et al. |
| 7,717,357 | B2 | 5/2010 | Gantenbein et al. |
| 9,242,846 | B2 | 1/2016 | Burns |
| 9,802,166 | B2 | 10/2017 | Hammerlund |
| 10,639,656 | B1 | 5/2020 | Hammerlund |
| 2003/0136399 | A1 | 7/2003 | Foley et al. |
| 2003/0226910 | A1 | 12/2003 | Anderson |
| 2005/0087623 | A1 | 4/2005 | Finn |
| 2006/0208000 | A1 | 9/2006 | Murray et al. |
| 2008/0031081 | A1 | 2/2008 | Rigolio |
| 2008/0144426 | A1 | 6/2008 | Janssen et al. |
| 2010/0065130 | A1 | 3/2010 | Swab et al. |
| 2010/0065660 | A1 | 3/2010 | Hull et al. |
| 2010/0065768 | A1 | 3/2010 | Swab et al. |
| 2010/0096481 | A1 | 4/2010 | Hull et al. |
| 2010/0200614 | A1 | 8/2010 | Von Rotz et al. |
| 2011/0209780 | A1 | 9/2011 | Gantenbein et al. |
| 2011/0273956 | A1 | 11/2011 | Habibi-Naini et al. |
| 2011/0319930 | A1 | 12/2011 | Roush et al. |
| 2012/0158048 | A1 | 6/2012 | Roush et al. |
| 2013/0028841 | A1 | 1/2013 | Yagi et al. |
| 2014/0107620 | A1 | 4/2014 | Fech et al. |
| 2016/0184847 | A1 | 6/2016 | Hammerlund |

OTHER PUBLICATIONS

Plas-Pak Industries, Inc. "Ratio-Pak® High Flow Threaded Static Mixers." Copyright 2009. Web. Oct. 9, 2016. http://blaspakinc.com/ratiopak-staticmixers.php.

OMG Roofing Products. "OMG Pace Cart 2 for Olybond500 Owner's Manual." Patented portable delivery system for OlyBond 500 Insulation Adhesive featuring patented bag-in-box technology. pp. 1-6. Copyright 2014.

Nordson EFD. "400 Autovalve Pneumatic Instructions/Parts List." Copyright 2015. Nordson Corporation. pp. 1-24.

Adco Roofing Products. "Millennium Cyclone 1 Low Pressure Pump Cartby Garlock." Product Information, believed to have been published prior to Oct. 16, 2015.

Cartridge Dispensing and Static Mixing List of Do's and Don'ts. Guidelines for Determining Appropriate Cartridges and Static Mixers for Dispensing Applications, believed to have been published prior to Oct. 16, 2015.

CROSSOVER PREVENTION VALVE

CROSS REFERENCE TO RELATED APPLICATIONS

The present application is a continuation-in-part of and claims priority to U.S. patent application Ser. No. 15/294,090, filed on Oct. 14, 2016, now U.S. Pat. No. 10,639,656, issued May 5, 2020, which claims priority to U.S. provisional application Ser. No. 62/242,589, filed Oct. 16, 2015, and the present application further claims the priority benefits of U.S. provisional application Ser. No. 62/888,008, all of which are hereby incorporated herein by reference in their entireties.

FIELD OF THE INVENTION

The present invention relates to multi-component mixing and dispensing systems, such as for spraying two-part polyurethane foam insulation, adhesives, and the like.

BACKGROUND OF THE INVENTION

Multi-component mixing and dispensing systems are commonly used to spray or otherwise dispense highly reactive fluids that are stored in separate containers and that flow under pressure through separate fluid lines to a dispensing gun having an on/off valve, and having a mixing nozzle (often a disposable piece) downstream of the on/off valve. Because the fluids begin a chemical reaction as soon as they come into contact with one another, the on/off valve must generally be turned on with sufficient frequency so that the mixed fluids do not have sufficient time to harden to a point where they would block flow through the nozzle. However, in addition to the risk that the on/off valve will inadvertently be turned off for too much time, there is a risk that a first of the component fluids could flow into the fluid line that is intended to contain only a second of the component fluids, which would result in a chemical reaction taking place in that fluid line and entirely blocking it. This condition can occur quickly and may result in significant down-time for the dispensing gun to be at least partially disassembled and manually cleaned out with tools and solvents, before re-assembly and re-use.

SUMMARY OF THE INVENTION

The present invention provides a crossover prevention valve for use in a multi-component fluid mixing and dispensing system, such as systems that are commonly used to dispense two-part polyurethane insulating foams and adhesives. The crossover prevention valve includes a valve body in which at least two one-way check valves are mounted at a forward end thereof. The forward end of the valve body defines a portion of a mixing chamber for reactive fluids that are dispensed through the valves. The valves do not permit any reverse flow, which prevents clogs in undesirable locations (in particular, inside a fluid conduit intended to carry only one type of reactive fluid), so that any cured material in the system is in a location where it is easily removed in order to restore the system to operational status. Any pauses during dispensing operations will not result in a lengthy cleaning or component-changing procedure, and reactive fluids are prevented from mixing upstream of the valves even if the fluid pressure downstream of the valves greatly exceeds the upstream fluid pressure.

In one form of the present invention, a crossover prevention valve includes a valve body and at least two one-way check valves. The valve body defines at least two fluid passageways with respective upstream end portions that receive respective reactive fluids from a manifold or other fitting, and with downstream end portions in which the check valves are mounted. The fluid passageways' upstream end portions are configured to sealingly engage or receive respective fluid outlet nozzles of the multi-component fluid mixing and dispensing system, so that pressurized fluids exiting the fluid outlet nozzles are received directly into the fluid passageways of the valve body. The check valves are operable to prevent fluid flow through respective ones of said first and second fluid passageways in response to either equal or elevated fluid pressure in an area forward of the valve body relative to a fluid pressure in either of the fluid passageways. The valve body is configured to define a portion of a fluid mixing chamber of the multi-component fluid mixing and dispensing system.

The crossover prevention valve resists any backflow of reactive fluids into fluid passageways intended for only one type of fluid, and facilitates the rapid changing of dispensing nozzles and readying for further dispensing of mixed fluids, thereby facilitating the operation of fluid mixing and dispensing systems through which reactive fluids flow under pressure and are ultimately dispensed onto other surfaces. The crossover prevention valve is also well suited for use with lower viscosity reactive fluids that can be mixed and dispensed by systems that operate at relatively low pressures.

These and other objects, advantages, purposes and features of the present invention will become apparent upon review of the following specification in conjunction with the drawings.

DESCRIPTION OF THE PREFERRED EMBODIMENTS

Figure 1:
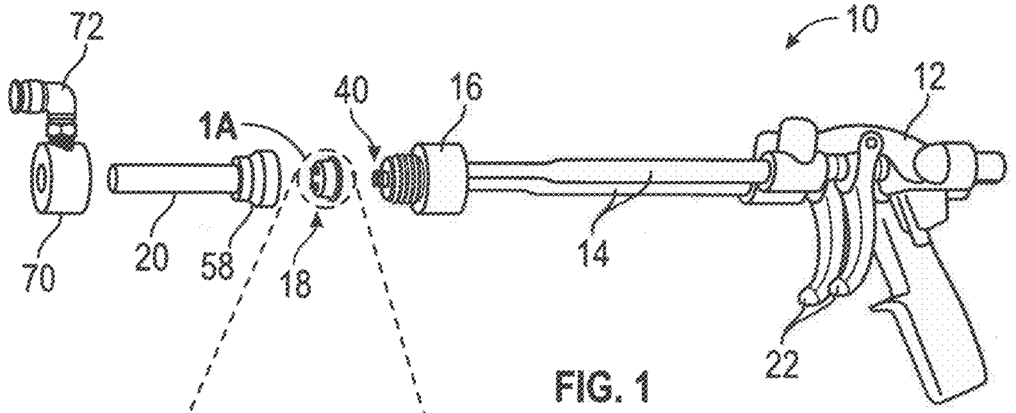
FIG. 1 is an exploded perspective view of a multi-component fluid mixing and dispensing system with crossover prevention valve in accordance with the present invention.
Figure 1A:
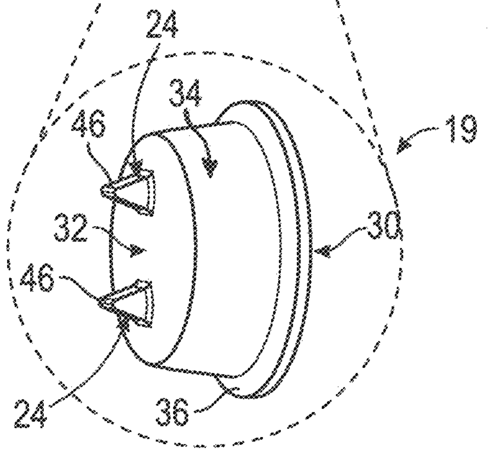
FIG. 1A is an enlarged view of the area designated 1A in FIG. 1.

Referring now to the drawings and the illustrative embodiments depicted therein, a multi-component fluid mixing and dispensing system 10 includes a dispensing gun 12 configured to receive and convey two different fluid reactants from respective fluid sources along a pair of conduits 14 to an end fitting or dispensing manifold 16, where crossover prevention valve 18 and a dispensing nozzle 20 are mounted, such as shown in FIG. 1. Mixing and dispensing system 10 is operated by depressing a pair of triggers 22 to allow the two different fluid reactants, which are pressurized when they reach the gun 12, to pass along conduits 14 and into end fitting 16, where the fluid reactants remain separate as they pass into crossover prevention valve 18. It will be appreciated that dispensing gun 12 is representative of substantially any common or known dispensing gun or apparatus capable of conveying two or more fluids along separate and isolated flow paths until a point or region at which they are to be mixed and/or discharged, and that the principles of the present invention may be adapted for use with substantially any desired dispensing system for two or more separate fluid streams.

As will be described in more detail below, crossover prevention valve 18 includes a valve body 19 in which a pair of one-way check valves 24 are mounted, the valves 24 permitting the fluids to flow out into a mixing chamber 26 defined by the crossover prevention valve 18 and a proximal end portion 20*a* of dispensing nozzle 20 (FIG. 3), but which valves 24 preclude any flow reversal (i.e., from the mixing chamber 26 into the valve body 19) even under significant pressure differentials, in part by closing more tightly in response to elevated downstream pressures. This arrangement permits the mixing and dispensing system 10 to be operated such that reactant fluids in mixing chamber 26 can be left to cure, without clogging the valve body's fluid passageways, while facilitating a quick change of the dispensing nozzle 20 to resume dispensing fresh reactant fluids.

Valve body 19 has two fluid passageways 28 extending therethrough, the fluid passageways 28 extending from inlet or upstream end portions 28*a* at a rearward body surface 30, to outlet or downstream end portions 28*b* at a forward body surface 32 (FIGS. 2-8). A perimeter body surface 34 is circular in cross-section and extends between the forward and rearward body surfaces 32, 30. In the illustrated embodiment, perimeter body surface 34 has a generally frusto-conical shape that tapers slightly inwardly toward forward body surface 32. In addition, a circular flange 36 is formed or established at rearward body surface 30, and has a somewhat larger diameter than the diameter of the adjacent region of perimeter body surface 34. Flange 36 may facilitate sealing off the mixing chamber 26 upon attachment of dispensing nozzle 20 to end fitting 16, as will be described below. In the illustrated embodiment, forward body surface 32 and rearward body surface 30 are both substantially planar and are parallel to one another, so that valve body 19 is a substantially solid and generally cylindrical shape.

Figure 3:
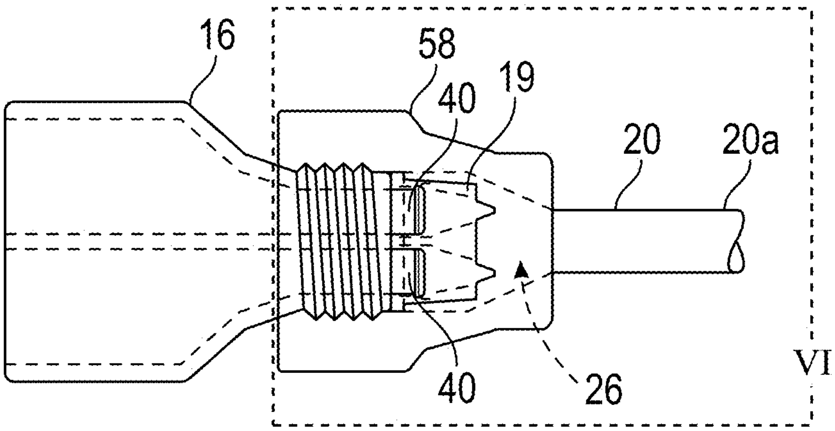
FIG. 3 is another side elevation of the end fitting, crossover prevention valve, and dispensing nozzle of the system of FIG. 1, shown in an assembled state.
Figure 4:
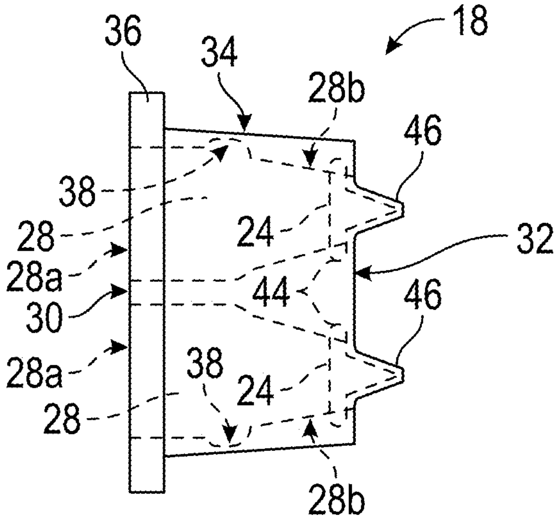
FIG. 4 is a side elevation of the crossover prevention valve, with internal structure depicted using phantom lines.
Figure 5:
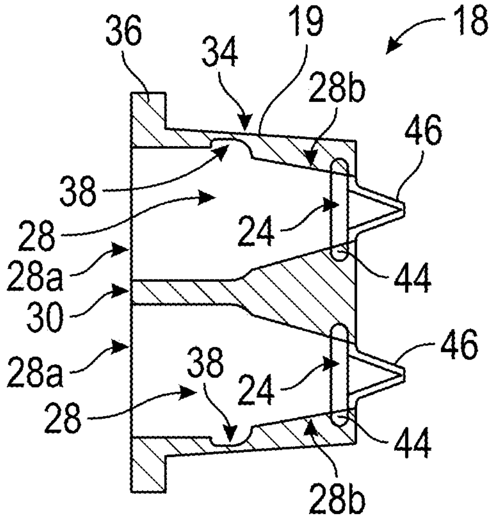
FIG. 5 is a sectional side elevation of the crossover prevention valve of FIG. 4.
Figure 6:
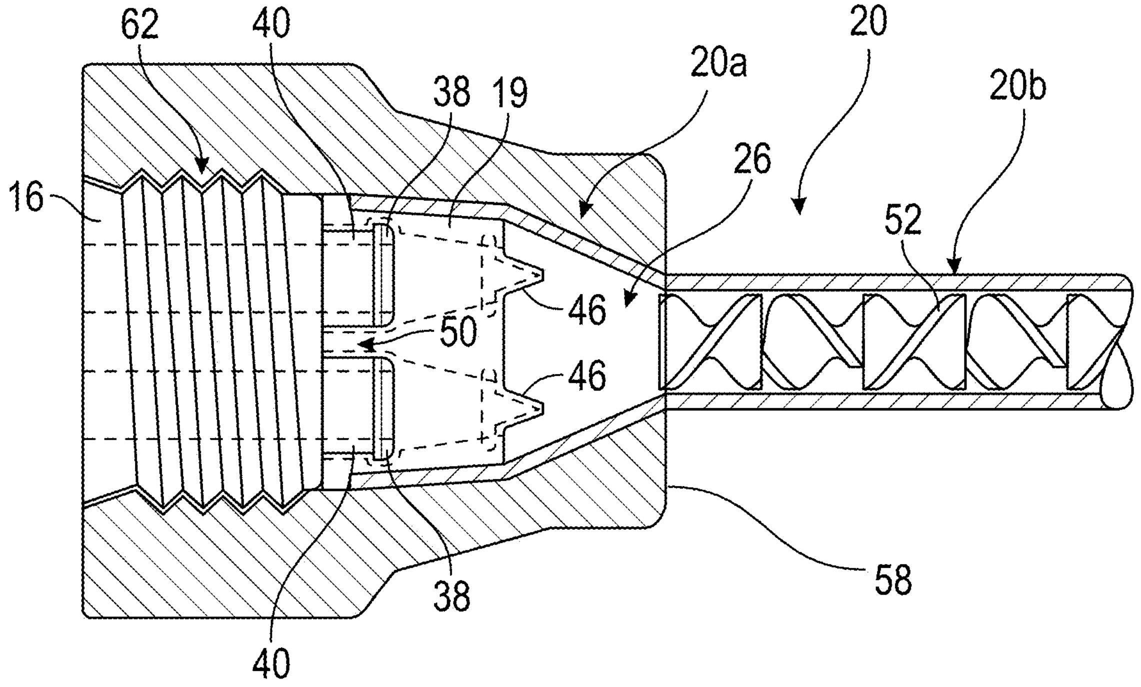
FIG. 6 is an enlarged view of the area designated VI in FIG. 3.
Figure 6A:
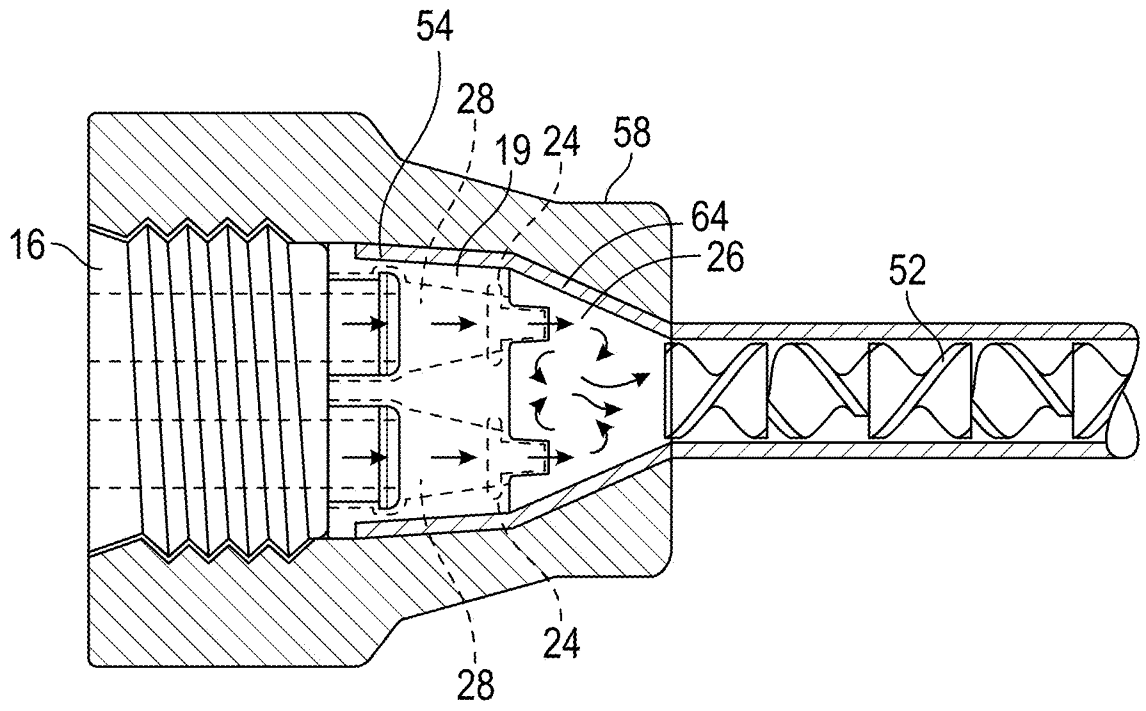
FIG. 6A is another enlarged view of the area of FIG. 6, shown in the valves-open configuration and depicting turbulent mixing of reactive fluids.

Each of fluid passageways 28 includes an enlarged-diameter region 38 in between the inlet and outlet end portions 28*a*, 28*b*, such as shown in FIGS. 4-5B. Fluid passageways 28 are sized and shaped to receive respective fluid outlet nozzles 40 of end fitting 16 (FIGS. 3, 6 and 6A). Thus, inlet end portions 28*a* of the fluid passageways 28 may be substantially the same diameter and length as the main diameter and length of the fluid outlet nozzles 40. Each of the nozzles 40 terminates at an enlarged-diameter flange 42, which provide a function similar to hose barbs when the nozzles 40 are inserted into the fluid passageways 28 of valve body 19, by retaining valve body 19 at end fitting 16 until it is manually removed by a user. Valve body 19 is made of a flexible and resilient material, such as silicone rubber or other elastomer, which allows inlet end portions 28*a* of fluid passageways 28 to expand around flanges 42 as the nozzles 40 are inserted into the fluid passageways 28 until flanges 42 are seated in the respective enlarged-diameter regions 38 of fluid passageways 28.

Figure 5A:
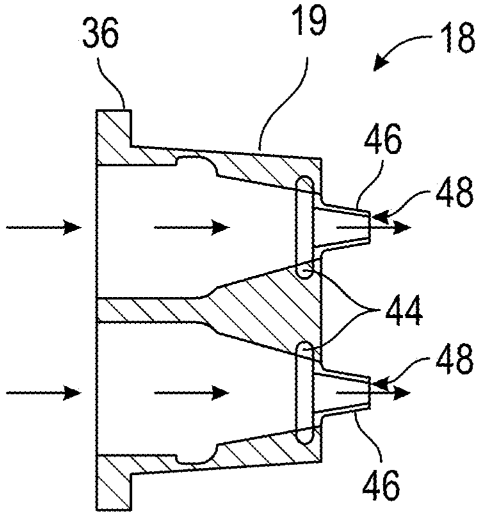
FIG. 5A is another sectional view of the crossover prevention valve of FIG. 5, shown in a valves-open configuration.

One-way check valves 24 are mounted in the outlet end portions 28*b* of the respective fluid passageways 28, downstream of the enlarged-diameter regions 38 of the fluid passageways, such as shown in FIGS. 4-5A. In the illustrated embodiment, check valves 24 are "duckbill" valves made of silicone rubber, which are available from many different sources including Minivalve, Inc. of Cleveland, Ohio. Other suitable duckbill valves may be made from resinous plastics, rubber or rubber-like material, or even metals. Duckbill valves exhibit very low flow resistance in the discharge direction (into mixing chamber 26), but seal tight in conditions of no pressure differential and also seal against backflow (i.e., from mixing chamber 26 into fluid passageways 28) in the presence of elevated fluid pressures in the mixing chamber 26. For example, if an operator of system 10 depressed only one trigger 22 of the two-trigger spray gun 12 while a blockage was present in dispensing nozzle 20, operating fluid pressure [which may be approximately 50 psi to 250 psi (345 kPa to 1,725 kPa), for example] would urge only a first of the reactant fluids into mixing chamber 26, which would quickly stabilize at the operating fluid pressure due to the blockage. In this condition, if not for the check valve 24 the pressure in mixing chamber 26 would force the first reactant fluid into the fluid passageway 28 of the second reactant fluid, thereby initiating a chemical reaction in the second reactant fluid's passageway 28 and quickly causing a further blockage that would render the system unusable until replacement or partial disassembly and cleaning of at least the end fitting 16 could be performed.

In the illustrated embodiment, duckbill check valves 24 have round bases 44 that serve as fluid inlets that are open to a respective fluid passageway 28, downstream of enlarged-diameter region 38. Round bases 44 are positioned behind forward body surface 32 and are substantially surrounded by molded material of valve body 19, which thereby secures the valves 24 in valve body 19. Check valves 24 have narrowed discharge tips 46 that project outwardly from forward body surface 32 and are in fluid communication with their bases 44. Because discharge tips 46 are located at forward body surface 32, any air or other compressible fluid (gas) that may be entrapped in fluid passageways 28, or in the fluid passageways of end fitting 16 or of conduits 14, will have no effect on the ability of check valves 24 to prevent undesired mixing and curing of the reactant fluids that could form an undesirable and difficult-to-clear blockage inside a fluid passageway that is intended to carry only one reactant fluid. It will be appreciated that other shapes of duckbill valves may be used, in addition to other types of one-way check valves, and that the crossover prevention valve of the present invention is not necessarily limited to embodiments having only certain types, shapes, or configurations of check-valves.

A slit formed in each discharge tip 46 is normally closed when there is no fluid pressure differential across the valve 24, and maintains a tight seal when fluid pressure downstream of discharge tip 46 (e.g., in the mixing chamber 26) is higher than the fluid pressure in the vicinity of base 44 (e.g., in the fluid passageway 28). Closed discharge tips 46 may also form an effective moisture barrier to isolate moisture-sensitive reactant fluids in fluid passageways 28 from humidity or liquid water in the surrounding environment, particularly when no dispensing nozzle 20 is attached. However, the slit in each discharge tip 46 readily forms an opening 48 (FIGS. 5B and 6B) in response to elevated fluid pressure in the vicinity of base 44 (e.g., in the fluid passageway 28) as compared to the fluid pressure downstream of discharge tip 46. Thus, reactant fluids are readily discharged through check valves 24 with minimal resistance in response to elevated fluid pressure in fluid passageways 28, and the check valves quickly close and remain sealed when there is no pressure difference across the valves or when the fluid pressure downstream of the discharge tips 46 is elevated.

Although duckbill valves have been determined to provide suitably low flow resistance in a discharged direction and to seal tightly against backflow, even under high pressures, it will be appreciated that other types of one-way check valves may also perform suitably, such as umbrella valves, spring-ball valves, and the like, any of which is designed to allow material to flow only in one direction. However, duckbill valves are an economical option that are readily incorporated into valve body 19, such as by placing the duckbill valves into a mold with their bases 44 facing downwardly and engaged by mold inserts that form the fluid passageways 28, then pouring or injecting liquid silicone rubber, or other suitable material, into the mold where it cures to form the valve body 19 and the finished crossover prevention valve 18 with the duckbill valves at least partially over-molded by the material of valve body 19. Optionally, a crossover prevention valve may be unitarily formed with all passageways and valves (such as duckbill valves) formed directly in a single piece of molded material. It is envisioned that by integrating or forming the valves directly with the same material that forms the valve body, the crossover prevention valve can be manufactured very economically as a one-piece unit, which may also have improved durability over a comparable valve having separate component parts that are molded or otherwise retained in place by adhesive or by other valve body material.

Rearward body surface 30 of valve body 19 engages a forward surface 50 of end fitting 16 that acts as a nozzle base, with a central wall portion of valve body 19 (between fluid passageways 28) engaging the nozzle base 50 between fluid outlet nozzles 40, such as shown in FIGS. 3 and 6-8. Valve body 19 is pressed into sealing engagement with nozzle base 50 upon securing the dispensing nozzle 20 in place. Dispensing nozzle 20 has an outwardly-flared proximal end portion 20*a* and a distal tip portion 20*b* in fluid communication with the proximal end portion 20*a*. Optionally, a turbulence-inducing mixer insert 52 is positioned in the distal tip portion 20*b* and serves to further mix the reactant fluids after they leave mixing chamber 26. In the illustrated embodiment, proximal end portion 20*a* has a slightly tapered or constant-diameter smooth-walled portion 54 that sealingly engages perimeter body surface 34 of valve body 19, and has a circular edge 56 that sealingly engages flange 36 of valve body 19 when dispensing nozzle 20 is fully seated (FIG. 6A). However, it will be appreciated that smooth-walled portion 54 could be omitted, and a tapered interior surface 64 of outwardly-flared proximal end portion 20*a* engaged with forward body surface 32 to form a seal near where forward body surface 32 meets perimeter body surface 34, while still forming a suitable mixing chamber 26.

Dispensing nozzle 20 is secured to end fitting 16 by a threaded collar 58 (FIGS. 2, 3, 6 and 6A) that is sized and shaped to permit distal tip portion 20*b* to slide freely through the collar, and to engage the outwardly-flared proximal end portion 20*a* and press it into contact with at least valve body 19 (FIGS. 3, 6 and 6A). Threaded collar 58 has interior threads 60 that engage male threads 62 of end fitting 16, which are rearward of nozzle base 50. As threaded collar 58 is rotated to tighten and secure it to end fitting 16, the outwardly-flared proximal end portion 20*a* is tightened against valve body 19 for form a fluid-tight seal between smooth-walled portion 54 and the valve body's perimeter body surface 34, and/or between circular edge 56 and the valve body's flange 36 (FIG. 3). This tightening also forms or strengthens a seal between the valve body's rearward surface 30 and the nozzle base 50 of end fitting 16, and forms or strengthens a seal between the interior surfaces of valve body 19 that form inlet end portions 28*a* and enlarged-diameter regions 28 of fluid passageways 28, and the exterior surfaces of fluid outlet nozzles 40 including enlarged-diameter flanges 42. It will be appreciated that the operational step of injecting reactant fluids only into fluid passageways 28, without applying fluid pressure directly against rearward body surface 30 of valve body 19 (FIG. 6A), limits or prevents any seepage or mixing of the reactant fluids in areas between the valve body 19 and the end fitting 16 and its outlet nozzles 40. The assembly of threaded collar 58 and dispensing nozzle 20 to end fitting 16 and valve body 19 results in the mixing chamber 26 being formed between forward body surface 32 and the tapered interior surface 64 of outwardly-flared proximal end portion 20*a*, which is located between smooth-walled portion 54 and distal tip portion 20*b* of dispensing nozzle 20.

By injecting the reactant fluids directly into fluid passageways 28 and out through check valves 24 into mixing chamber 26, reacted or cured product of the mixed fluids is precluded from forming anywhere but along and in front of forward body surface 32 (i.e., in the mixing chamber 26), although it is envisioned that some limited amount of reacted or cured product could be present along at least a forward portion of perimeter body surface 34, between the perimeter body surface 34 and smooth-walled portion 54 of dispensing nozzle 20. The hardened product may form a plug 66 in mixing chamber 26 (FIG. 7) when triggers 22 are released to stop the flow of reactant fluids, such as at the end of a spraying session. Therefore, it is desirable that forward body surface 32 has a smooth surface texture resembling a polished surface, preferably having non-stick characteristics, to facilitate removal of any cured and hardened product of the reactant fluids present in mixing chamber 26. In addition, it will be observed that forward body surface 32 is substantially lacking in outwardly-extending walls or other shapes that could cause cured and hardened product to stick, and which also permits substantially the entire volume of mixing chamber 26 to be used for fluid mixing since the fluid chamber is not bifurcated. The check valves' dispensing tips 46, which may protrude or extend forwardly into mixing chamber 26 from forward body surface 32 such as shown in the illustrated embodiment, are also preferably sufficiently smooth so as to be readily released from the hardened product, and form wedge-shapes with pointed tips when they are closed, which further facilitates releasing the tips 46 from any cured product.

Figure 7:
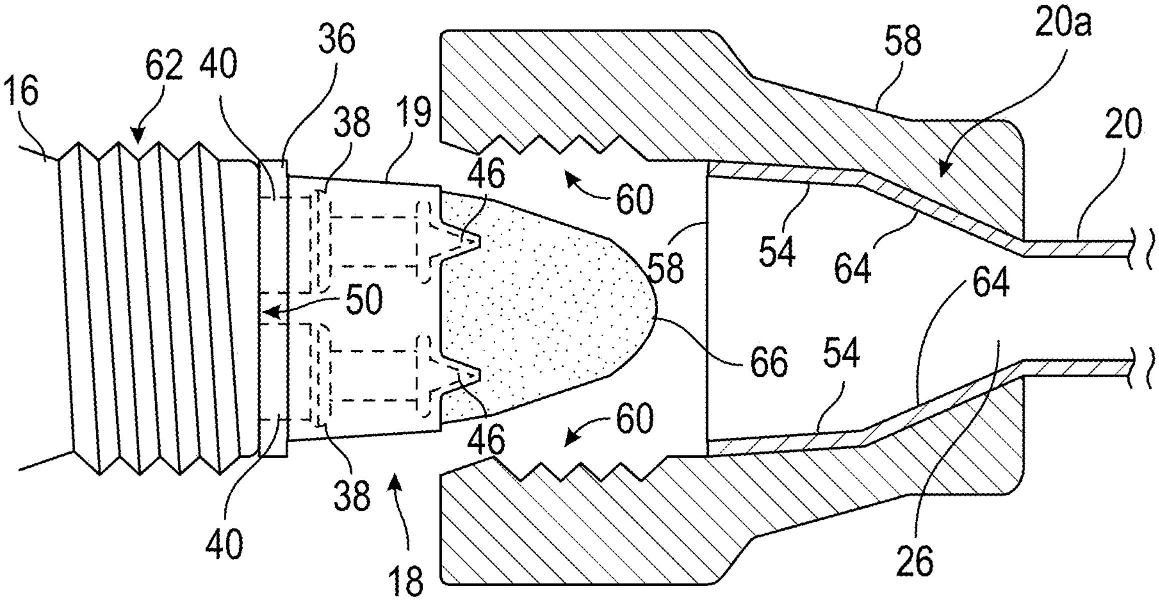
FIG. 7 is another enlarged view of the area of FIG. 6, shown with the dispensing nozzle removed and a piece of cured material adhered to a front surface of the valve body.
Figure 8:
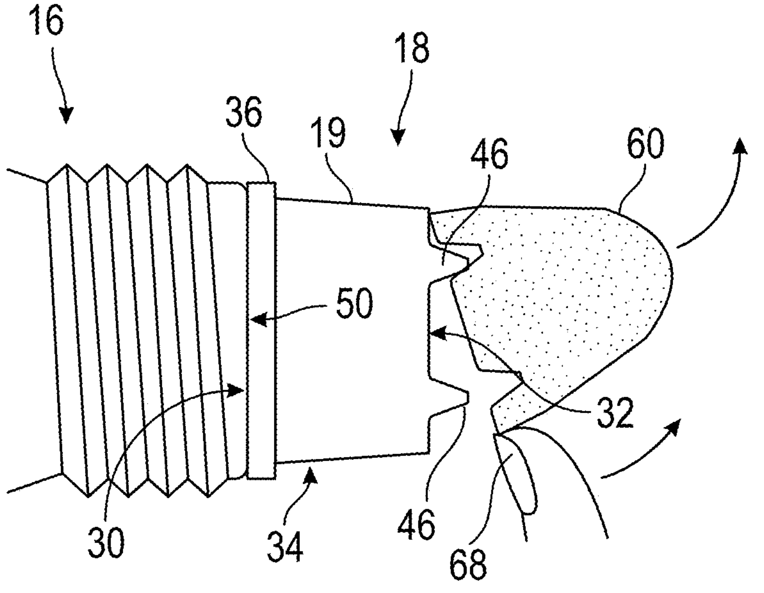
FIG. 8 is another enlarged view of the area of FIG. 6, shown with the dispensing nozzle removed and depicting the cured material being removed from the front surface of the valve body.

When plug 66 has formed, it is readily cleared and the mixing and dispensing system 10 readied for further spraying or dispensing by removing dispensing nozzle 20 (which is typically an inexpensive disposable item that is discarded after use, rather than cleaned) by unscrewing threaded collar 58 and pulling dispensing nozzle 20 away from valve body 19 and end fitting 16. This action alone may cause plug 66 to pull away from valve body 19 and remain inside the flared proximal end portion 20*a* of dispensing nozzle 20, which permits the immediate installation of a fresh dispensing nozzle 20 so that the mixing and dispensing system 10 is again ready for use. However, if plug 66 remains attached to valve body 19 upon removal of dispensing nozzle 20, such as shown in FIG. 7, it is generally a quick and simple matter for an operator to remove the plug 66 by peeling it away from forward surface 32 of valve body 19 using a thumbnail 68 or tool between forward body surface 32 and plug 66, such as shown in FIG. 8. By forming valve body 19 of a relatively soft resilient material such as silicone rubber or other elastomer, the valve body may be readily deflected to facilitate working a fingernail or small tool between the plug 66 and valve body 19, and to momentarily change the shape of the valve body's surfaces (particularly forward surface 32 and perimeter surface 34) to facilitate separation of the hardened plug from the valve body surfaces.

It will be appreciated that valve body 19 is typically sufficiently retained at end fitting 16, via engagement of fluid outlet nozzles 40 in fluid passageways 28, so as to resist or prevent removal of the valve body 19 from the end fitting 16 when an operator attempts to remove plug 66 in the above-described manner. However, if valve body 19 were inadvertently removed during this cleaning operation, it can be readily re-seated at end fitting 16 after removal of the plug 66. In this case, care should be taken to ensure that the outlet nozzles 40 are re-inserted into the same fluid passageways 28 as before, since a change (without first cleaning out the fluid passageways) could result in the undesired mixing of reactant fluids in the fluid passageways. Therefore, it is envisioned that a keying arrangement may be used to ensure that valve body 19 can only be mounted on outlet nozzles 40 in a single orientation, to limit or prevent inadvertent mixing of reactant fluids inside valve body 19 if the valve body were removed and replaced at the end fitting after an initial use of the mixing and dispensing system 10.

Other valve body arrangements are envisioned in addition to the valve body 19 described above and shown in the drawings, which alternative arrangements would also facilitate quickly readying the mixing and dispensing system 10 for use after a sufficiently long pause in operation that results in the fluid reactants solidifying in the mixing chamber 26. For example, a valve body may be formed with inlet nozzles protruding rearwardly from the rearward surface, where the inlet nozzles would be insertable into respective rearwardly-extending bores formed in the nozzle base of the system's end fitting. Optionally, a valve body having three or more fluid passageways, such as for conveying three or more reactant fluids, or for conveying two or more reactant fluids plus a non-reactant fluid (e.g., a thinner or solvent, a colorant, or a gas), is also envisioned as being within the scope of the present invention. It is further envisioned that a suitable valve body could be sized and shaped to be received in a recess formed in a forward end of the system's end fitting, such as with an interference fit, so as to retain the valve body in the recess via the interference fit instead of (or in addition to) retaining the valve body via engagement of fluid outlet nozzles inside the valve body's fluid passageways. A suitable valve body may also be integrally or unitarily formed at an end portion of a manifold or end fitting similar to end fitting 16.

The resulting mixing and dispensing system 10 requires minimal maintenance and attention during use, particularly since any mixing of the reactant fluids is limited to areas of the mixing chamber 26 and distal tip 20*b* of the dispensing nozzle 20, of which the dispensing nozzle 20 is readily removable and replaceable, and the valve body's forward body surface 32 will readily release any hardened plug 66 of cured material that initially adheres to is. Thus, a mixing and dispensing system 10 that is operated by spraying or otherwise discharging reactant fluids, followed by the spray or discharge operation being halted a sufficient amount of time so as to form a cured or partially-cured plug 66 of reacted material, can be returned to service in a matter of seconds and without any tools, scraping, or solvents.

Various aspects of crossover prevention valve 18 may be selected as a matter of design choice, such as to optimize it for reactant fluids having different viscosities, operating pressures, and mix ratios. For example, in order to achieve a 1:1 mix ratio of two reactant fluids at the same operating pressure but one reactant fluid having higher viscosity than the other reactant fluid, it may be necessary to provide a larger diameter fluid passageway and a check valve having a larger opening for the higher viscosity reactant fluid. The material selected for valve body 19 may also be chosen for its relative hardness or softness, its ability to form a fluid-tight seal with other components such as end fitting 16 and dispensing nozzle 20 at a wide range of temperatures, its resistance to deterioration due to contact with the reactant fluids that it is intended to carry and/or due to frequent handling, as well as its raw material and forming costs.

Optionally, compressed air or other mixing gas (or other fluid) may be introduced to a mixing chamber via a separate fluid-injection collar 70 (FIG. 1). Fluid-injection collar 70 is used to secure dispensing nozzle 20 to end fitting 16 in substantially the same manner that threaded collar 58 does so. However, the flared proximal end portion 20*a* of the dispensing nozzle 20 may be shaped somewhat differently than is shown in FIGS. 2, 3 and 6A-7, in order to permit a fluid passageway in the fluid-injection collar 70 to be open to the mixing chamber. Thus, the mixing chamber in this particular embodiment would be formed between the forward body surface 32 of the valve body 19, the tapered interior surface of the dispensing nozzle's proximal end portion, and a generally cylindrical interior surface of fluid-injection collar 70. Fluid-injection collar 70 permits pressurized gases (e.g., air) or other fluids (e.g., colorants, blowing agents, solvents) to be introduced in to the mixing chamber via a conduit or fitting 72, such as to facilitate agitating and mixing the reactant fluids, to clear the mixing chamber and nozzle of reactant fluids, for example. Such a fluid injection collar, as well as a complete multi-component fluid mixing and dispensing system, are more fully described in commonly-owned U.S. patent application Ser. No. 14/885,476, filed Oct. 16, 2015 (corresponding to U.S. Publication No. 2016/0184847), entitled "VORTEX MIXING AND RATIO ADJUSTMENT SYSTEM," which is a continuation-in-part of U.S. patent application Ser. No. 14/470,261, filed Aug. 27, 2014 (corresponding to U.S. Pat. No. 9,802,166), entitled "VORTEX MIXING SYSTEM," both of which are hereby incorporated herein by reference in their entireties.

In addition to simplifying the procedure needed to resume use of a multi-component fluid mixing and dispensing system, the crossover prevention valve 18 facilitates the operation of relatively low pressure mixing and dispensing systems, and compatible reactant fluids. For example, favorable operation may be obtained at fluid operating pressures of about 50 psi to 250 psi (345 kPa to 1,725 kPa), as compared to higher pressure systems that must be operated at fluid pressures at about 250 psi (345 kPa) or higher, in which case a higher standard of personal protective equipment ("PPE") may be required to be worn by operators. However, the valves in the crossover prevention valve 18 may be sensitive enough to permit fluid flow in the intended flow direction with pressure differentials of less than 1 psi. Thus, the pumps, motors, and fluid fittings and conduits associated with the multi-component fluid mixing and dispensing system may be made substantially lighter, less powerful, and less energy-consuming than known systems that must be operated at higher pressures. However, it will be appreciated that the crossover prevention valve of the present invention may be readily incorporated and adapted for use in higher pressure systems, as desired. Such systems are more fully described in the commonly-owned published U.S. patent applications that are incorporated hereinabove.

Although the crossover prevention valve 18 has been found to provide desirable results when used in a multi-component fluid mixing and dispensing system, it may be possible to achieve similar or even better performance using alternative configurations of the crossover prevention valve discussed above, which alternative configurations are illustrated in FIGS. 9-14 and discussed in more detail below. It is contemplated that the alternative configurations may provide additional benefits, such as for example to facilitate impingement mixing of two fluid components, or to reduce complexity and/or production costs for the crossover prevention valve. In many respects these alternative configurations are similar or nearly identical to the crossover prevention valve 18, such that the following discussion of the alternative configurations will focus primarily on the configuration differences.

Figure 9:
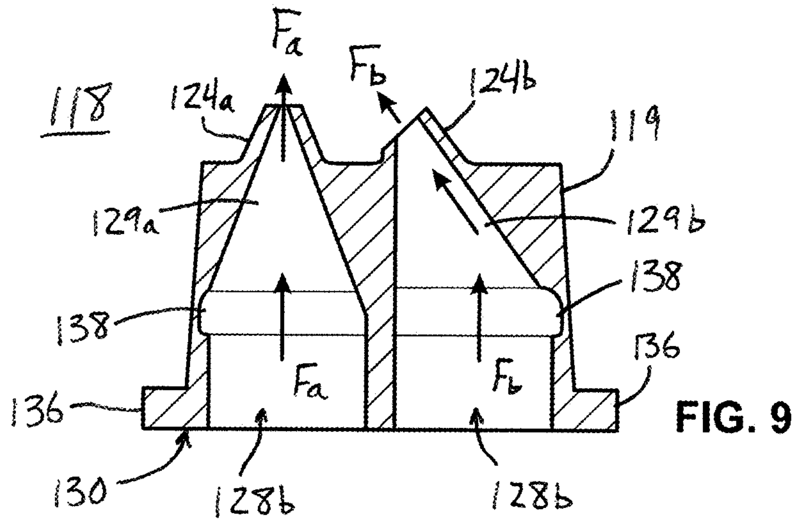
FIGS. 9-14 are sectional side elevations of multiple alternative embodiments of crossover prevention valves in accordance with the present invention.
Figure 10:
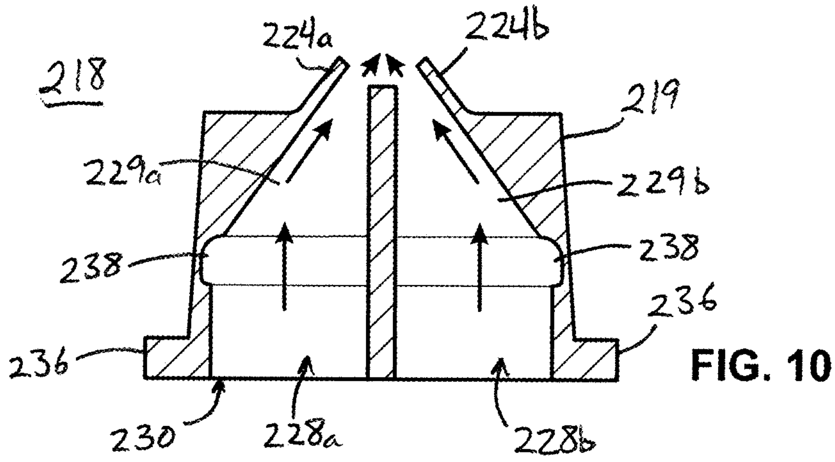

With reference to FIG. 9, another crossover prevention valve 118 includes a valve body 119 in which a pair of one-way check valves 124*a* and 124*b* are mounted or integrally formed. The valve body 119 may be formed from a relatively soft resilient material such as silicone rubber or other elastomer, such that one-way check valves 124*a* and 124*b* made from silicone will quickly "snap" closed once pressure is equalized on either side of the respective check valve, or if higher pressure is on the downstream side of the valves. That is, silicone rubber has little or no discernable "memory" for its valve-open configuration, such that it quickly returns to its natural (valve-closed) state once the flow is halted. Two fluid passageways 128*a* and 128*b* extend through the valve body 119 and are in fluid communication with the respective check valves 124*a* and 124*b*. Each of the fluid passageways 128*a*, 128*b* includes an enlarged-diameter region 138 for receiving nozzle flanges, such as described above. The check valves 124*a*, 124*b* permit the fluids flowing through the respective fluid passageways 128*a*, 128*b* to flow out along respective fluid axes Fa, Fb into a mixing chamber defined by the crossover prevention valve 118 and the proximal end portion 20*a* of dispensing nozzle 20, such as in the manner shown in FIG. 3. Additionally, valve body 119 includes a circular flange 136 formed at a rearward body surface 130.

In the illustrated embodiment of FIG. 9, a downstream end portion 129*b* of the fluid passageway 128*b* is angled or slanted towards a downstream end portion 129*a* of the fluid passageway 128*a*, which extends along fluid flow axis Fa and is aligned generally perpendicular to the rearward body surface 130. Consequently, a longitudinal extent of check valve 124*b* is directed or angled towards a longitudinal extent of check valve 124*a*, which longitudinally extends along fluid flow axis Fa and is aligned generally perpendicular to the rearward body surface 130. While both check valves 124*a*, 124*b* maintain respective fixed flow axes, the angled configuration of the check valve 124*b* relative to the check valve 124*a* is particularly useful when mixing two fluid components at different ratios, such as for example 10:1 (with higher flow through valve 124*a*, and with the flow through valve 124*b* impinging into the flow out of valve 124*a*). Such configuration of the check valves 124*a*, 124*b* ensures proper mixing of the two fluid components, rather than the lower-flow fluid component being pushed aside by the higher-flow fluid component, which could limit or prevent complete mixing. It should be appreciated that arrows are used in FIGS. 9-11 to generally indicate fluid flow through the respective valves, despite some valves being illustrated as more open than others. The valves may be expected to open to different degrees according to flow rate and/or fluid pressure.

In FIGS. 10-14 it will be understood that components and regions of additional embodiments of crossover prevention valves 218, 318, 418, 518, and 618, which correspond to components and regions of the crossover prevention valve 118 of FIG. 9, are assigned corresponding numerals with the addition of 100, 200, 300, 400, and 500, respectively. Referring to the crossover prevention valve 218 of FIG. 10, a valve body 219 includes a pair of one-way check valves 224*a* and 224*b* that are mounted or integrally formed. Valve body 219 defines two fluid passageways 228*a* and 228*b* that are in fluid communication with the respective check valves 224*a* and 224*b*. In the illustrated embodiment, downstream end portions 229*a*, 229*b* of the respective fluid passageway 228*a*, 228*b* are angled towards one another, along with longitudinal axes of check valves 224*a*, 224*b* being directed or angled towards one another. While both check valves 224*a*, 224*b* maintain respective fixed flow axes, the configuration of check valves 224*a*, 224*b* angled towards one another provides for impingement mixing of the respective fluids immediately after exiting the respective check valves, which may at times be desired.

Figure 11:
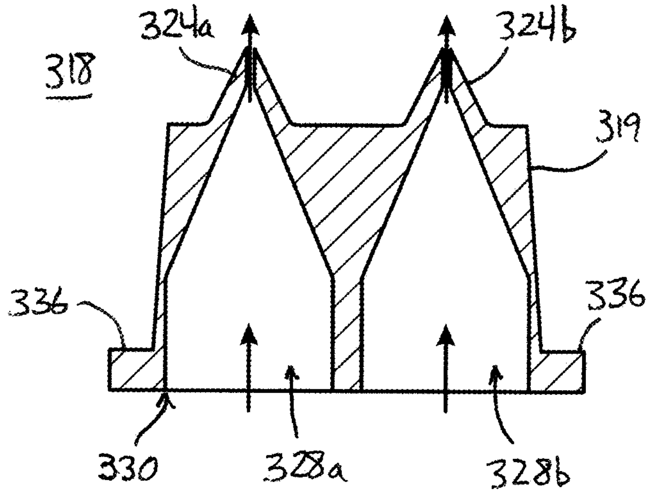
Figure 12:
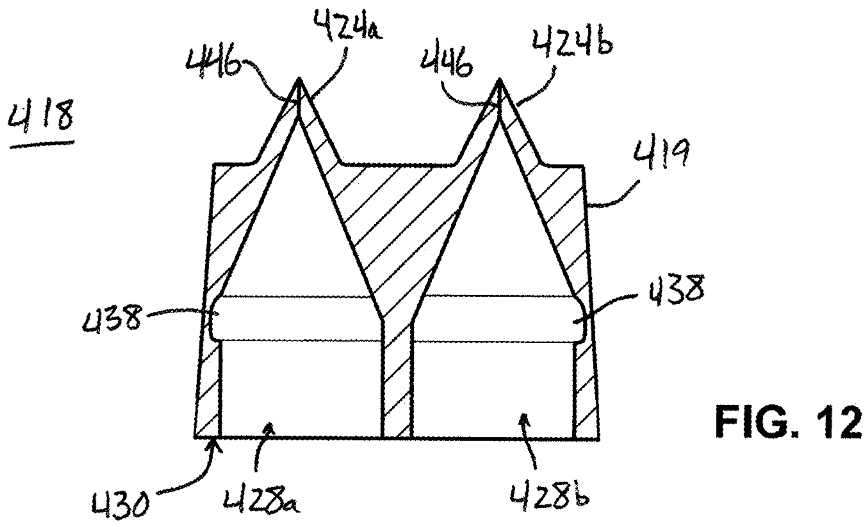

In the embodiment of FIG. 11, a crossover prevention valve 318 is substantially similar to the crossover prevention valve 18 described above, except that fluid passageways 328*a*, 328*b* do not include an enlarged-diameter region to receive respective enlarged-diameter flanges 42 (FIG. 2) to hold the crossover prevention valve 318 in place. Referring to FIG. 12, another crossover prevention valve 418 is also substantially similar to the crossover prevention valve 18 described above, except that valve body 419 does not include a circular flange formed at a rearward body surface 430. In the illustrated embodiment of FIG. 12, a slit 446 formed in each discharge tip of check valves 424*a*, 424*b* is shown as closed when there is no fluid pressure differential across the valves 424*a*, 424*b*, or when the downstream fluid pressure (in the mixing chamber) is greater than the upstream fluid pressure in the fluid passageways 428*a*, 428*b*.

Figure 2:
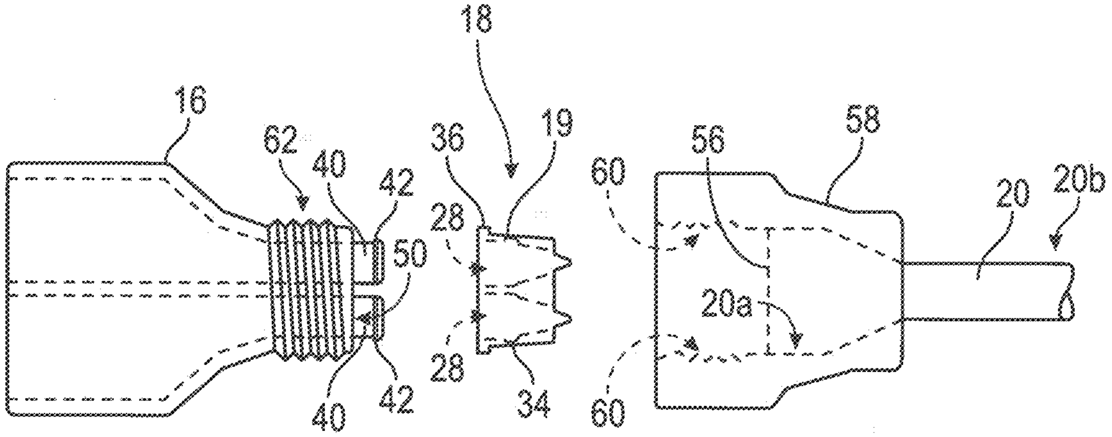
FIG. 2 is an exploded side elevation of the end fitting, crossover prevention valve, and dispensing nozzle of the system of FIG. 1.
Figure 13:
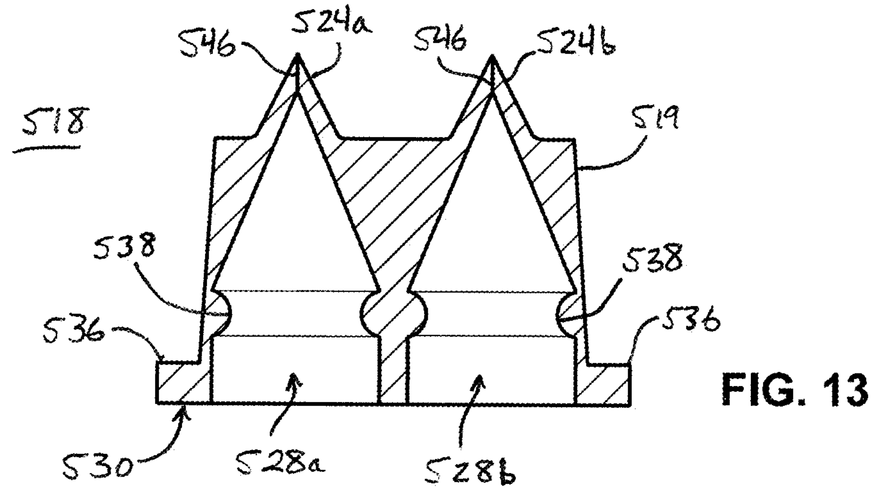
Figure 14:
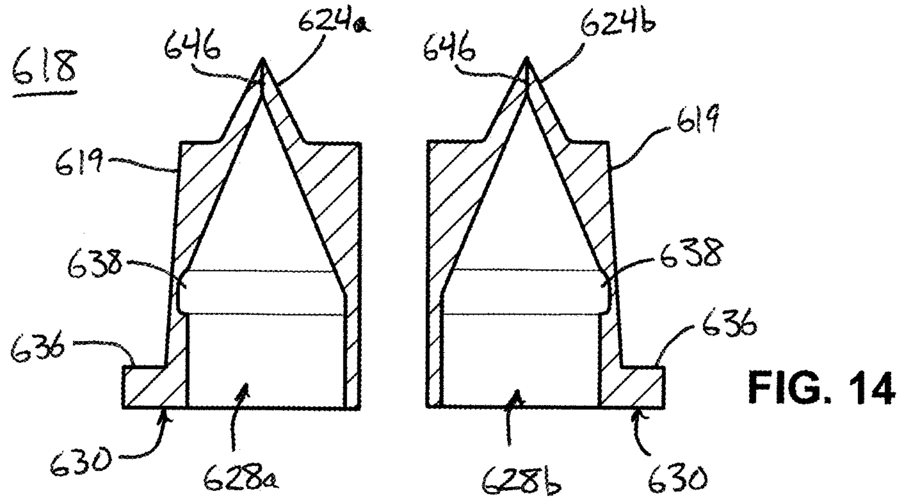

Referring now to FIG. 13, another crossover prevention valve 518 is similar to the crossover prevention valve 18 described above, except that fluid passageways 528*a*, 528*b* do not include an enlarged-diameter region. Instead, each fluid passageway 528*a*, 528*b* includes a reverse undercut 538 extending around fluid passageways 528*a* and 528*b* to hold the crossover prevention valve 518 in place. In the illustrated embodiment of FIG. 13, a slit 546 formed in each discharge tip of check valves 524*a*, 524*b* is shown as closed when there is no fluid pressure differential across the valves 524*a*, 524*b*, or when the downstream fluid pressure (in the mixing chamber) is greater than the upstream fluid pressure in the fluid passageways 528*a*, 528*b*. In the embodiment of FIG. 14, a crossover prevention valve 618 is similar to the crossover prevention valve 18 described above, except that crossover prevention valve 618 is split into two separate but identical pieces or parts, with each part having a fluid passageway 628*a* and 628*b* configured to be separately mounted over respective fluid outlet nozzles 40 of dispensing manifold 16, such as shown in FIG. 2. In the illustrated embodiment of FIG. 14, a slit 646 formed in each discharge tip of check valves 624*a*, 624*b* is shown as closed when there is no fluid pressure differential across the check valves 624*a*, 624*b*, or when the downstream fluid pressure (in the mixing chamber) is greater than the upstream fluid pressure in the fluid passageways 628*a*, 628*b*.

Figure 15:
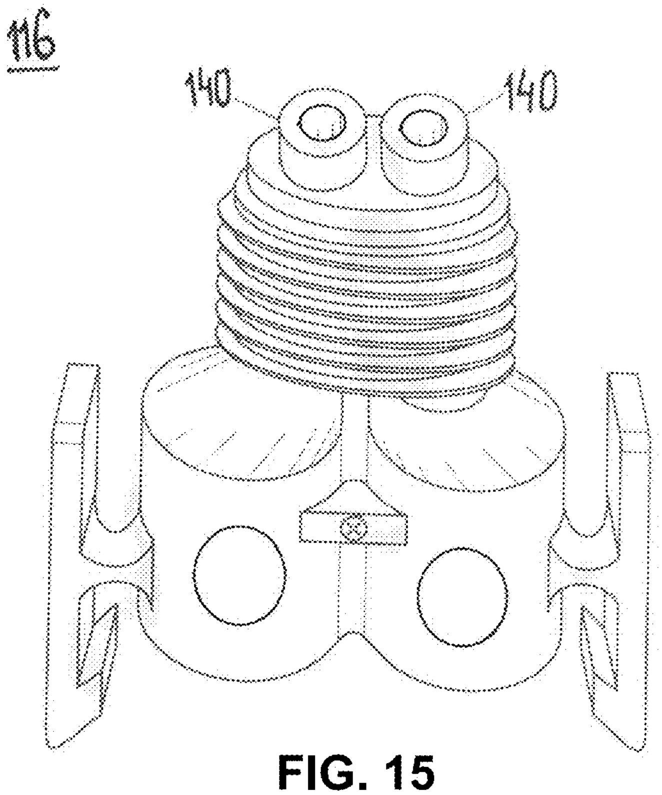
FIG. 15 is a perspective view of a dispensing manifold for use with crossover prevention valves.
Figure 16:
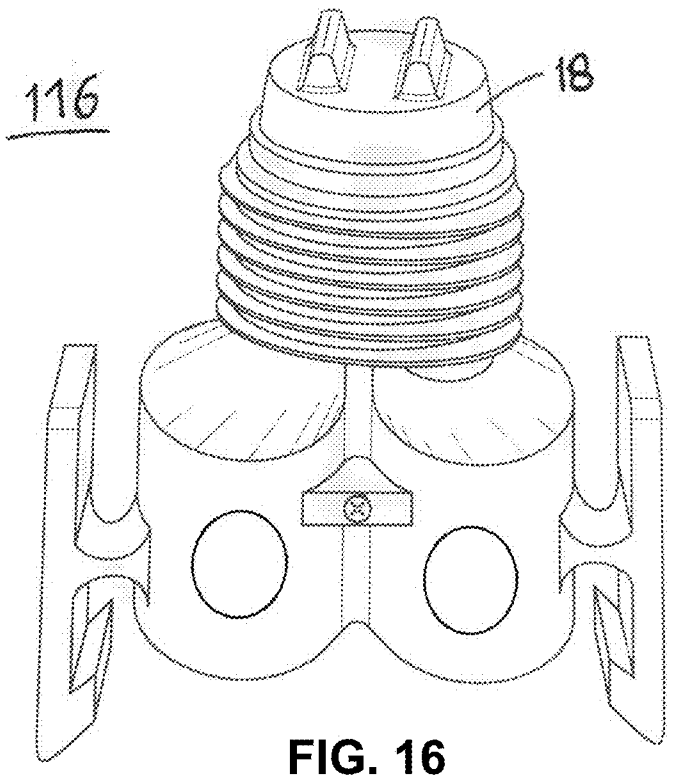
FIG. 16 is a perspective view of the dispensing manifold of FIG. 15, shown fitted with the crossover prevention valve of FIG. 1.
Figure 17:
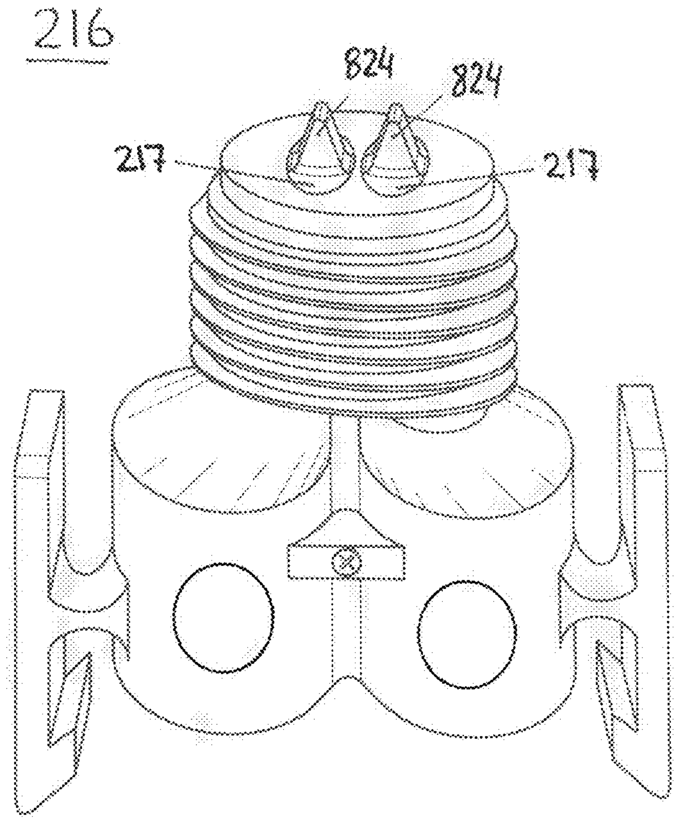
FIG. 17 is a perspective view of another dispensing manifold, shown fitted with one-way check valve inserts.
Figures 18A, 18B, 18C, 18D:
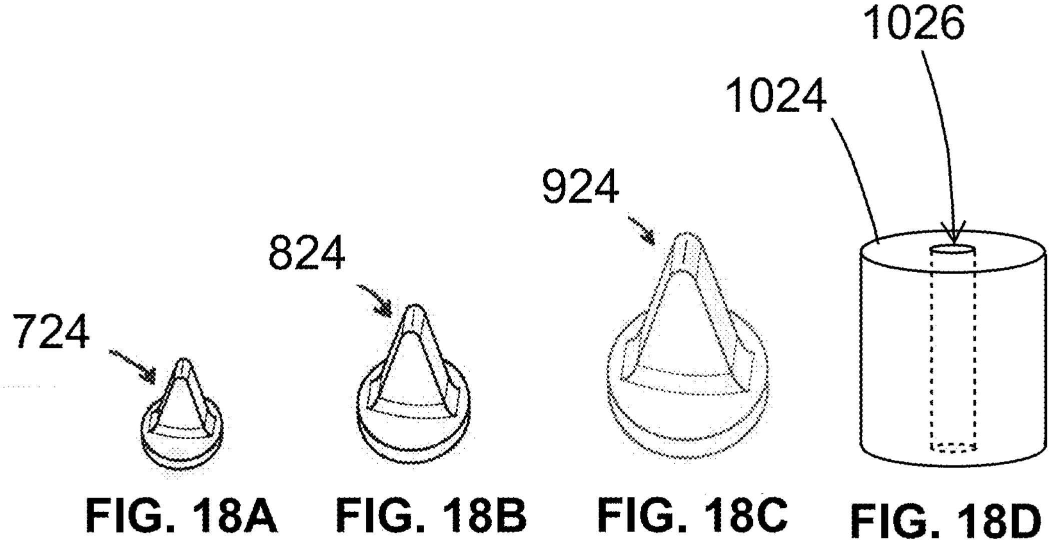
FIGS. 18A-18C are perspective views of a variety of one-way check valve inserts.
FIG. 18D is a perspective view of a flow-restricting insert.

Referring to FIGS. 15 and 16, a dispensing manifold 116 is similar to the dispensing manifold 16 discussed above with reference to FIG. 1, and is more fully described in commonly-owned co-pending U.S. provisional patent application, Ser. No. 62/888,008, filed Aug. 16, 2019 and entitled "MULTIPLE FLUID APPLICATION SPLIT MANIFOLD," which is hereby incorporated herein by reference in its entirety. In FIG. 15 the dispensing manifold 116 is shown without the crossover prevention valve and in FIG. 16 the crossover prevention valve 18 is mounted to the manifold 116. Another dispensing manifold 216 (FIG. 17) is configured to receive a pair of one-way check valves 724, 824, 924 having different sizes, such as shown in FIGS. 18A-18C. Desired check valves 724, 824, 924 may be inserted or over-molded into a dispensing end of the dispensing manifold 216 such as shown in FIG. 17, in which a pair of check valves 824 is inserted into a pair of cylindrical openings 217. Alternatively the check valves 824 may be over-molded in the dispensing manifold 216. The differently sized check valves 724, 824, 924 may be chosen for the dispensing manifold 216 according to fluid viscosity, desired flow rates, desired flow ratios, and the like.

Optionally, and with reference to FIG. 18D, a flow-restrictor 1024 may be inserted into one or both cylindrical openings 217 of the dispensing manifold 216, or into the fluid outlet nozzles 40 of the end fitting 16 described above. Flow-restrictor 1024 may be made from silicone rubber or substantially any suitable rigid or semi-rigid material, and used to restrict fluid flow through a given nozzle 40, 140 or cylindrical opening 217 by channeling all flow through a reduced-size bore 1026. By selecting a desired flow-restrictor 1024 according to size of its bore 1026, a user may select the fluid flow ratio between the two (or more) outlets or nozzles of a given manifold. When a check valve is fitted over or downstream of the flow-restrictor 1024, the check valve receiving restricted flow will still emit that flow into the mixing chamber provided that the fluid pressure exiting the flow-restrictor 1024 exceeds the fluid pressure of the mixing chamber, but in a thinner or otherwise smaller stream than the higher-flow fluid of the other, non-restricted outlet(s) or nozzle(s). It will be appreciated that a similar effect may also be achieved without the use of a flow-restrictor 1024, such as by regulating (reducing) the fluid pressure of one fluid flow compared to the fluid pressure of the other fluid flow, to achieve an uneven (non-1:1) ratio of one fluid component to the other in the mixing chamber.

Thus, the crossover prevention valve of the present invention is effective in simplifying the use of multi-component reactive fluid mixing and dispensing systems, such as may be used for spray-dispensing two-part polyurethane foams for building or vehicle insulation, or for dispensing two-part epoxy adhesives, or the like. Such systems may include, for example, polyurethane elastomer systems, polyurethane adhesive and coating systems, polyurethane and polyurea systems, polyacrylic and polyurethane systems, epoxy adhesive systems, and substantially any reactive chemical system where cross contamination is to be avoided. The crossover prevention valve ensures that any mixing of reactive fluids takes place only in desired locations where any buildup of cured material can quickly and easily be cleared so that the system can be readied for further use. Although it is envisioned that the crossover prevention valve can be reused many times through many spaced-apart dispensing or spraying operations, the valve may be sufficiently economical as to be considered a disposable component that can be replaced daily, weekly, monthly or at any desired interval if it incurs wear during use.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. A crossover prevention valve for a multi-component fluid mixing and dispensing system, said crossover prevention valve comprising:

a valve body defining first and second fluid passageways therethrough, said first and second fluid passageways having respective upstream end portions and downstream end portions, said valve body having a perimeter body surface directly connecting a forward body surface and a rearward body surface of said valve body;

wherein said upstream end portions of said first and second fluid passageways are configured to sealingly receive respective fluid outlet nozzles of the multi-component fluid mixing and dispensing system, whereby pressurized fluids exiting the fluid outlet nozzles are received at said valve body only by respective ones of said first and second fluid passageways;

first and second one-way check valves positioned at respective ones of said downstream end portions of said first and second fluid passageways, wherein said first and second one-way check valves are operable to prevent fluid flow through respective ones of said first and second fluid passageways in response to equal or elevated fluid pressure in an area forward of said valve body relative to a fluid pressure in either of said first and second fluid passageways;

wherein said forward body surface of said valve body is configured to define a rearward portion of a fluid mixing chamber of the multi-component fluid mixing and dispensing system; and wherein said perimeter body surface of said valve body is configured to sealingly and releasably engage an inner wall portion of a dispensing nozzle fitted over said valve body.

2. The crossover prevention valve of claim 1, wherein a flow axis of said first one-way check valve is oriented generally perpendicular to said rearward body surface of said valve body, and wherein a flow axis of said second one-way check valve is angled toward the flow axis of said first one-way check valve.

3. The crossover prevention valve of claim 1, wherein said valve body comprises a generally cylindrical shape, wherein said forward and rearward body surfaces are substantially parallel to one another, and wherein said first and second fluid passageways are spaced inwardly from said perimeter body surface.

4. The crossover prevention valve of claim 3, wherein said first and second one-way check valves each have a respective forward end portion that projects outwardly from said forward body surface regardless of whether said first and second one-way check valves are open or closed.

5. The crossover prevention valve of claim 1, wherein said rearward body surface is configured to engage a nozzle base from which the fluid outlet nozzles project.

6. The crossover prevention valve of claim 5, wherein said forward body surface is configured to sealingly engage a proximal end portion of the dispensing nozzle.

7. The crossover prevention valve of claim 6, wherein said forward body surface of said valve body and the proximal end portion of the dispensing nozzle cooperate to define the fluid mixing chamber of the multi-component fluid mixing and dispensing system.

8. The crossover prevention valve of claim 1, wherein said first and second fluid passageways of said valve body comprise enlarged-diameter regions disposed between said upstream and downstream end portions, wherein each of said enlarged-diameter regions is configured to receive an outwardly-extending flange of one of the fluid outlet nozzles, and wherein said valve body is configured to be retained at the fluid outlet nozzles via engagement of the outwardly-extending flanges in said enlarged-diameter regions.

9. The crossover prevention valve of claim 1, wherein said first and second one-way check valves comprise duckbill valves.

10. A crossover prevention valve for a multi-component fluid mixing and dispensing system, said crossover prevention valve comprising:

a valve body having a forward body surface, a rearward body surface spaced from said forward body surface, and a perimeter body surface directly connecting said forward and rearward body surfaces, wherein said forward body surface is configured to define a portion of a fluid mixing chamber, and wherein said perimeter body surface of said valve body is configured to sealingly and releasably engage an inner wall portion of a dispensing nozzle that defines a forward portion of said fluid mixing chamber;

first and second fluid passageways extending through said valve body, each of said first and second fluid passageways including an inlet proximate said rearward body surface and an outlet proximate said forward body surface; and first and second valves positioned at respective ones of said outlets of said first and second fluid passageways;

wherein said first and second valves are operable to permit fluid flow through respective ones of said first and second fluid passageways in response to an elevated fluid pressure in said first and second fluid passageways relative to a fluid pressure in an area forward of said forward body surface; and wherein said first and second valves are operable to prevent fluid flow through respective ones of said first and second fluid passageways in response to equal or elevated fluid pressure in the area forward of said forward body surface relative to a fluid pressure in said first and second fluid passageways.

11. The crossover prevention valve of claim 10, wherein said perimeter body surface is generally circular in shape, and said forward and rearward body surfaces are substantially parallel to one another.

12. The crossover prevention valve of claim 10, wherein said valve body comprises silicone rubber.

13. The crossover prevention valve of claim 10, wherein said first and second valves comprise respective forward end portions that project outwardly from said forward body surface.

14. The crossover prevention valve of claim 10, wherein said first and second valves comprise duckbill valves.

15. The crossover prevention valve of claim 10, wherein said first and second fluid passageways are configured to sealingly engage respective fluid outlet nozzles of the multi-component fluid mixing and dispensing system, whereby pressurized fluids exiting the fluid outlet nozzles are received at said valve body by respective ones of said first and second fluid passageways.

16. The crossover prevention valve of claim 15, wherein said dispensing nozzle is configured for temporary attachment to a spray gun.

17. The crossover prevention valve of claim 16, wherein each of said fluid outlet nozzles comprises an outwardly-extending flange, said first and second fluid passageways comprise enlarged-diameter regions disposed between said inlets and said outlets, and wherein each of said enlarged-diameter regions is configured to receive a respective one of said outwardly-extending flanges to thereby retain said valve body at said fluid outlet nozzles.

18. A crossover prevention valve for a multi-component fluid mixing and dispensing system, said crossover prevention valve comprising:

a valve body defining first and second fluid passageways therethrough, said first and second fluid passageways having respective upstream end portions and downstream end portions, said valve body having a perimeter body surface directly connecting a forward body surface and a rearward body surface of said valve body;

wherein said upstream end portions of said first and second fluid passageways are configured to sealingly receive respective fluid outlet nozzles of the multi-component fluid mixing and dispensing system, whereby pressurized fluids exiting the fluid outlet nozzles are received at said valve body by respective ones of said first and second fluid passageways;

first and second one-way check valves incorporated into said valve body at respective ones of said downstream end portions of said first and second fluid passageways, wherein said first and second one-way check valves are operable to prevent fluid flow through respective ones of said first and second fluid passageways in response to equal or elevated fluid pressure in an area forward of said valve body relative to a fluid pressure in either of said first and second fluid passageways;

wherein said forward body surface of said valve body is configured to define a rearward portion of a fluid mixing chamber of the multi-component fluid mixing and dispensing system.

19. The crossover prevention valve of claim 1, wherein said first and second one-way check valves are incorporated into said valve body.

20. The crossover prevention valve of claim 10, wherein said first and second valves are incorporated into said valve body.

* * * * *